United States Patent
Roch

Patent Number: 5,496,458
Date of Patent: Mar. 5, 1996

[54] ELECTROMAGNETIC ENRICHING DEVICE FOR ELECTROLYTES

[76] Inventor: Ricardo Roch, 4698 E. 10th La., Hialeah, Fla. 33013

[21] Appl. No.: 440,148
[22] Filed: May 12, 1995
[51] Int. Cl.$^6$ ................. C02F 1/48; C25B 9/00
[52] U.S. Cl. ........... 204/272; 204/275; 204/DIG. 5; 204/DIG. 8; 204/671
[58] Field of Search ............... 204/228, 229, 204/272, 305, DIG. 5, DIG. 8, 275

[56] References Cited

U.S. PATENT DOCUMENTS

| | | | |
|---|---|---|---|
| 4,293,400 | 10/1981 | Liggett | 204/272 X |
| 4,545,887 | 10/1985 | Arnesen et al. | 204/302 |
| 4,572,775 | 2/1986 | Paniagua | 204/229 |
| 4,810,344 | 3/1989 | Okazaki | 204/DIG. 5 |

Primary Examiner—Donald R. Valentine
Attorney, Agent, or Firm—J. Sanchelima

[57] ABSTRACT

An electromagnetic enriching device for electrolytes that are passed through a tubular cathode electrode that coaxially houses a sacrificial anode member. The electrolyte enters a housing containing the tubular cathode member and passes through an electric field established between the anode member and the tubular cathode member. Varying and alternating electromagnetic field is created by a coil wound over the cathode tubular member in order to interfere with the cations leaving the sacrificed anode member. In the manner, the device can be connected to a source of water, applying an electrolyte conditioner and resulting in an enriched water that will be applied to plants that require a particular nutrient. The anode member will be selected depending on the nutrient needed by the plant.

4 Claims, 1 Drawing Sheet

ELECTROMAGNETIC ENRICHING DEVICE FOR ELECTROLYTES

BACKGROUND OF THE INVENTION

1. Field of the Invention

The present invention relates to micronutrient enriching devices for electrolytes, and more particularly, to such devices that include an electromagnetic field coacting with the electric field developed in an electrolytic process.

2. Description of the Related Art

Applicant believes that the closest reference corresponds to U.S. Pat. No. 4,789,448 issued to Derek A. Woodhouse for a device for control of scale formation. The patented device discloses the use of a cathode and an anode, and the latter is designed, as a sacrificial anode. The anode however, releases salt particles intended to encourage crystal formation and reducing scaling. A magnetic field is generated downstream of the anode and cathode. However, it differs from the present invention because the magnetic field is (a) downstream and not coacting with the electric field in the electrolyte, (b) the magnetic field is constant and does not vary, and (c) the electromagnetic field in the present invention is not designed to assist in the coagulation and formation of crystals by orienting random particles.

Here, the present invention provides a device to dissolve metals that are needed as micronutrients for plants. The changing electromagnetic field prevents the traveling ionic particles from adhering to an electrode or to each other so that they can more effectively reach the target, typically plants. Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that permits a user to provide a predetermined amount of preselected metals in solution to target areas.

It is another object of this invention to provide a device that maximizes the amount of dissolved particles emitted by the anode.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
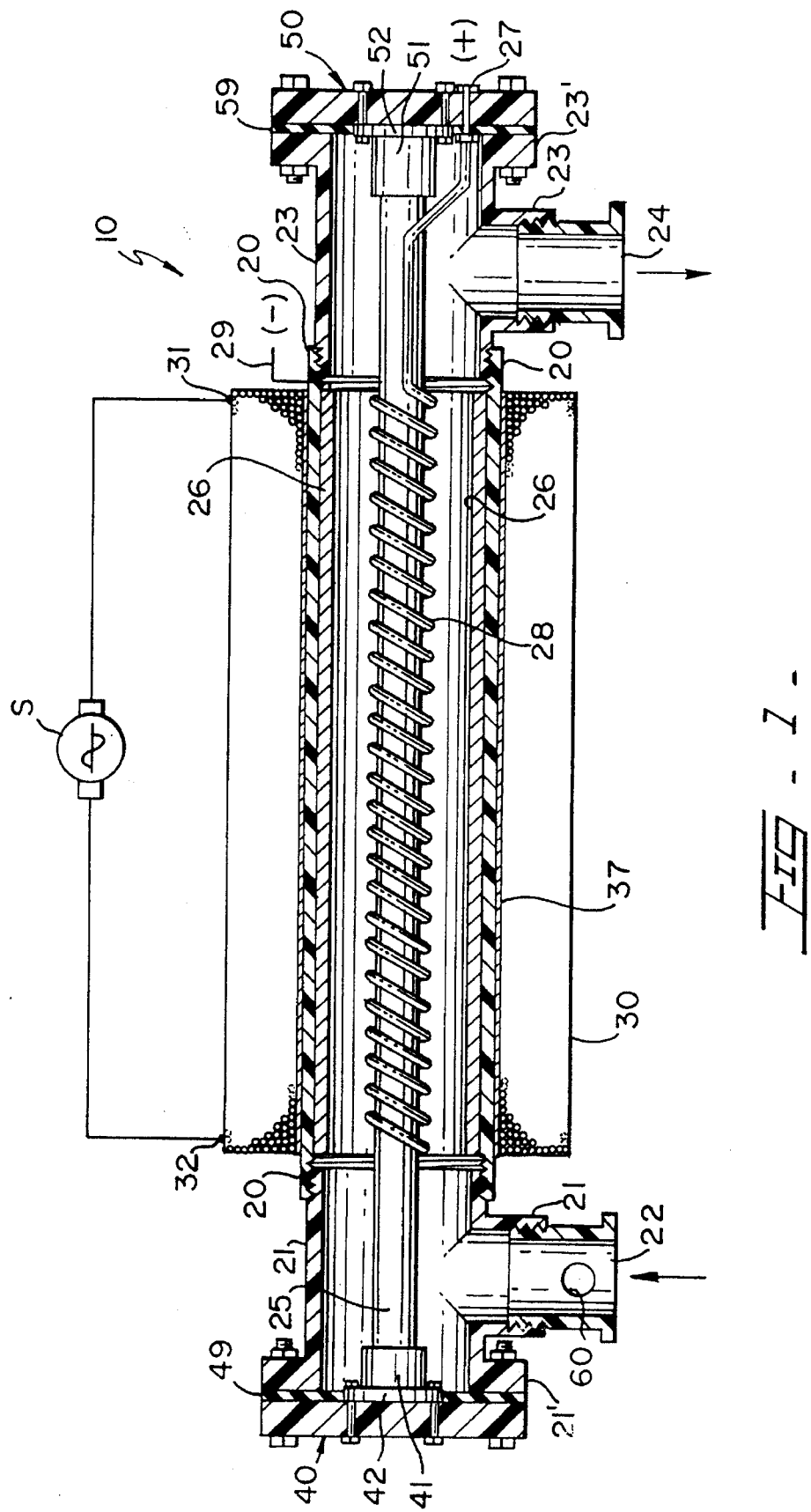
FIG. 1 represents an elevational cross-sectional view of a preferred embodiment for the device subject of the present application.

Referring now to the drawings, where the present invention is generally referred to with numeral 10, it can be observed that it basically includes housing 20 with water inlet 22 and outlet 24. Housing 20 encloses cathode tubular member 26 and anode member 28 coaxially disposed within member 26. In the preferred embodiment, housing 20 is implemented with an elongated tubular member. Coil assembly 30 is wound over member 26 to provide an alternating electromagnetic field within member 26.

As it can be seen in FIG. 1, T-connector 21 is mounted to one end of housing 20. The other end of T-connector 21 receives cover member 40 Supporting bracket member 42 includes bushing 41 designed to receive one end of supporting rod 25 over which anode member 28 is mounted, preferably wound over rod 25. Rubber seal 49 is sandwiched between cover 40 and flanged end 21' of T-connector 21. T-connector 23 is mounted to the other end of housing 20. The other end of rod 25 is received by bushing 51 mounted to supporting bracket member 52 of cover assembly 50. Rubber seal 59 is sandwiched between cover 50 and flanged end 23' of T-connector 23. In this manner, rod member 25, and consequently anode member 28, are suspended coaxially within tubular member 26. The positive pole of a D.C. electric power source is connected to anode electrode contact 27 and the negative is connected to cathode contact 29. In the preferred embodiment the current intensity is maintained between 1 and 2 amperes.

Coil 30 is wound over tubular member 26 which is covered by non-conducting film 37, in the preferred embodiment shown. Contacts 31 and 32 are connected to a source of alternating current, such as a conventional 60 hz, 120 volts source S available in the public network. An intensity and direction changing electromagnetic field is created within member 26.

In operation, water comes in through inlet 22, passes through T-connector 21, tubular member 26, T-connector 23 and it finally comes out through outlet 24. The electric field between anode assembly 28 and cathode tubular member 26 causes the cations to travel towards the cathode; typically amalgamating (scaling) against the inner surface of member 26. Some of the cations are swept out by the flow of water, but the stronger the electric field is, the lower the number of cations that are allowed to exit. However, by creating a changing electro-magnetic field within the electric field driving the cations and anions, the latter are interfered with preventing them from reaching their respective electrode destinations. In this manner, the anode is more effectively dissolved and more cations are allowed to exit with less scaling.

Anode member 28 will be selected depending on the micronutrient needed by the target plants. For instance, anode assembly may be iron if the plant needs this nutrient. The amount of iron exiting outlet 24 will be in direct proportion to the electric field and the intensity of the electromagnetic fields.

Injection opening 60 provides an entry point for electrolyte conditioning substances. These substances may be required to adjust the conductivity of the water coming in. If the water entering device 10 is too pure, its conductivity may not be sufficient for electrolytic action. Substances such as sodium chloride, EDTA (ethylendiamine tetra acetic acid), sulfuric acid, etc, may be added to adjust the conductivity and electrolyte characteristics of the water entering device 10.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electromagnetic enriching device for electrolytes, comprising:

A. housing means having an inlet and an outlet, said inlet being connected to a source of water, and said housing means further including a cathode tubular member having first and second ends;

B. an anode member coaxially housed within said cathode tubular member;

C. direct electric current source means having a positive pole connected to said anode member and a negative pole connected to said cathode member;

D. coil means wound over said housing means; and

E. alternating electric source means connected to said coil means so that an alternating electromagnetic field is created within said cathode tubular member.

2. The device set forth in claim 2 wherein said housing means includes means for injecting electrolyte conditioning substances within said housing means at a point substantially adjacent to said inlet.

3. The device set forth in claim 2 wherein said housing means includes first and second T-connector means mounted to said first and second ends and said housing means further includes first and second cover means removably mounted to said first and second T-connector means, and said first and second cover means including each means to removably support said anode member.

4. The device set forth in claim 3 wherein said housing means has a tubular shape.

* * * * *